United States Patent [19]

Topouzian

[11] 4,192,911
[45] Mar. 11, 1980

[54] SODIUM SULFUR BATTERY SEAL

[75] Inventor: Armenag Topouzian, Birmingham, Mich.

[73] Assignee: Ford Motor Company, Dearborn, Mich.

[21] Appl. No.: 956,758

[22] Filed: Nov. 1, 1978

[51] Int. Cl.$^2$ ............................................. H01M 2/00
[52] U.S. Cl. .................... 429/104; 429/174; 429/185
[58] Field of Search ............... 429/104, 101–103, 429/171, 172, 174, 185, 191, 31, 163, 164

[56] References Cited
U.S. PATENT DOCUMENTS

| | | | |
|---|---|---|---|
| 3,928,071 | 12/1975 | Thornton | 429/104 X |
| 3,939,007 | 2/1976 | Sudworth et al. | 429/104 X |
| 3,959,013 | 5/1976 | Breiter | 429/104 X |
| 4,024,321 | 5/1977 | Tilley | 429/104 |
| 4,048,391 | 9/1977 | Tilley et al. | 429/104 |
| 4,049,889 | 9/1977 | Heintz | 429/174 |
| 4,104,448 | 8/1978 | Gibson et al. | 429/104 X |
| 4,110,516 | 8/1978 | Breiter | 429/104 |

Primary Examiner—Anthony Skapars
Attorney, Agent, or Firm—William E. Johnson; Keith L. Zerschling

[57] ABSTRACT

This invention is directed to a seal for a sodium sulfur battery in which a flexible diaphragm sealing elements respectively engage opposite sides of a ceramic component of the battery which separates an anode compartment from a cathode compartment of the battery.

4 Claims, 3 Drawing Figures

SODIUM SULFUR BATTERY SEAL

The invention herein described was made in the course of or under a contract or subcontract thereunder with the Department of Energy.

BACKGROUND OF THE INVENTION AND PRIOR ART STATEMENT

This invention is directed to a seal for a sodium sulfur battery in which a flexible diaphragm sealing elements respectively engage opposite sides of a ceramic component of the battery which separates an anode compartment from a cathode compartment of the battery.

While I am aware of the disclosures contained in many patents in the sodium sulfur battery area, I am unaware of any prior art which shows or suggests a seal for a sodium sulfur battery such as disclosed in this application. U.S. Pat. No. 4,024,321 does use a spring element 18 in order to affect some sealing in a sodium sulfur battery, but that sealing is brought about by an axial spring action of the spring element 18.

In general, I developed the sealing structure disclosed in this specification in order to develop a seal for a sodium sulfur battery which was simple in construction and efficient in operation. I principally desired to develop a seal which could be contained within the diameter of the outer can member of the battery. In such a manner, a plurality of batteries may be positioned more closely to one another in forming a large battery for a power load balancing application. I also desired to develop a seal which could be made from relatively inexpensive materials and be made in a manner such that an effective seal is easily generated upon assembly of the structure disclosed in the specification.

SUMMARY OF THE INVENTION

This invention relates to a seal for a sodium sulfur battery and, more particularly, to an improved seal for using flexible diaphragm seals against a ceramic member of the battery which acts as a separator between the battery's anodic compartment and its cathodic compartment. The flexible diaphragm seal of this invention will allow the ceramic member to be out of phase on location with its associated container, will allow for misalignment on cold assembly, will allow for movement of cell components when the cell is going through freeze thaw cycles, and will allow for the difference in component growth when heated.

The seal of this invention may be made against a very smooth surfaced ceramic member. In the case where a smooth ceramic member is used, the improved seal includes the following structure. An outer metal can member of circular cross section is used which has an open end. A ring-shaped flexible diaphragm seal is provided which has an inner circumferential edge and an outer circumferential edge, which outer circumferential edge is bonded in a gas tight relationship to the open end of the outer can member. The ring-shaped flexible diaphragm seal has a "U" shaped cross section between its circumferential edges to provide resiliency thereto. The inner circumferential edge of the ring-shaped flexible diaphragm seal is in interference fit with a smooth outer facing surface of a ring-shaped ceramic member which also has a smooth, inner facing surface. The interference fit between the smooth outer facing surface of the ring-shaped ceramic member and the inner circumferential edge of the ring-shaped flexible diaphragm seal provides a gas tight seal therebetween. An outer diameter of a disc-shaped inner flexible diaphragm seal having a curved cross section is in interference fit with the smooth, inner facing surface of the ring-shaped ceramic member to provide a gas tight seal therebetween. In such a manner, a gas tight seal is provided on both sides of a ceramic member which is used to separate the compartments of a sodium sulfur battery. The ceramic member may be the electrolyte of the battery.

In an alternate construction, the ring-shaped ceramic member is left in its "as sintered" state, namely, a state in which the outer facing surface and inner facing surface thereof are rough, rather than a smooth condition which is brought about by grinding of a sintered ceramic material. In the situation where the ceramic member is left in its "as sintered" condition, a thin coating of a soft metal is formed on both the inner facing surface and the outer facing surface of the ring-shaped ceramic member to define a smooth surface on both the inner facing surface and the outer facing surface thereof. The metal coating, when engaged by the interference fit of the aforementioned flexible diaphragm seal and disc-shaped inner flexible diaphragm seal, provides the means whereby a gas tight seal is formed between the mentioned components.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in conjunction with the accompanying drawings wherein like characters indicate like parts throughout the several figures, and in which:

DESCRIPTION OF A PREFERRED EMBODIMENT

Figure 1:
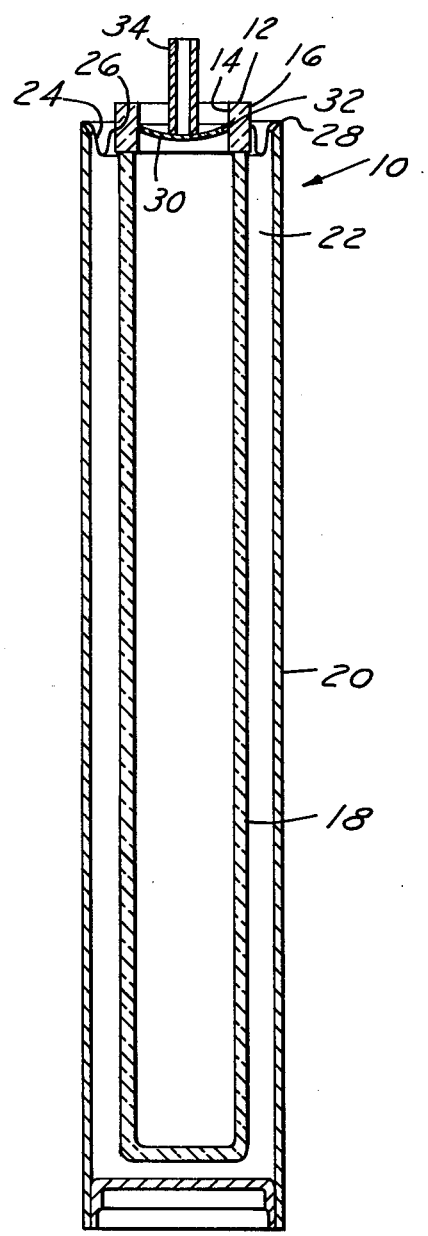
FIG. 1 is an elevation view, in cross section, of a sodium sulfur battery sealed by a seal of my invention.

The general principle of operation of a sodium sulfur battery is well known to those skilled in the art, as is evidenced by the great number of patents which have issued in this area. Therefore, no discussion will be undertaken herein of the theory and operation of such a battery.

Those skilled in the art know that it is necessary to seal the anodic compartment of the battery from the cathodic compartment of the battery so that the battery may carry out its intended function. Many different types of seals have been developed as is evidenced by the number of patents which have issued in this area. However, I am unaware of any sealing structure like or similar to the structure to be disclosed herein.

Also, for the sake of simplicity, only the general components of a sodium sulfur battery are shown in the drawings. Many of the particular components that are used in order to achieve operability of the battery are not shown in the drawings as these components are not necessary to teach to one skilled in the art the seal construction of this application. Reference is now made to the drawings.

In FIG. 1, there is seen a hermetically sealed alkali metal battery, generally designated by the numeral 10. This battery includes a ceramic ring 12 which has an inner surface 14 and an outer surface 16. In the case of the preferred embodiment, the ceramic material is formed from a material such as alpha alumina of high purity, such as 99.8%. Also in accordance with the teachings of a preferred embodiment of this invention, the inner surface 14 and the outer surface 16 of the ceramic ring 12 are ground by a suitable grinding device, such as a diamond wheel, in order to achieve a smooth continuous flat surface thereon.

An inner casing 18 of a solid alkaline ion-conductive material is in the form of a closed end tube. This casing is used as a reaction zone separator and will permit the transfer of ions of an anodic reactant therethrough to a cathodic reactant. The casing 18 is bonded by a glass seal, not shown, at its open end to a bottom surface of the ceramic ring 12.

Figure 3:
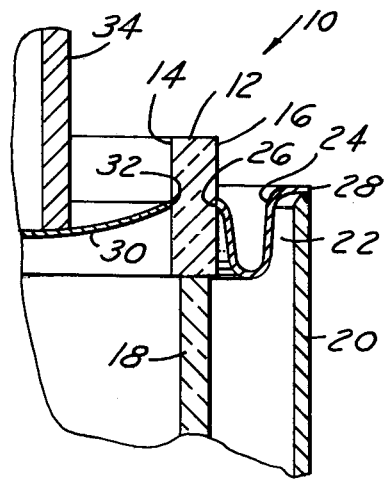
FIG. 3 is an exploded view of one corner of the battery of FIG. 1 showing the sealing structure in larger dimension.
Figure 2:
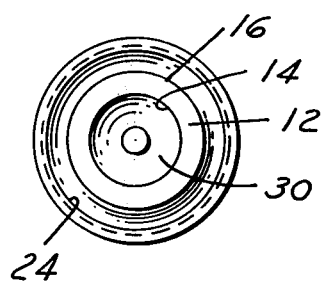
FIG. 2 is a top view of the sodium sulfur battery of FIG. 1.

An outer metal can member 20 of circular cross section is also provided. This can member has an open end 22. A ring-shaped flexible diaphragm seal 24 has an inner circumferential edge 26 and an outer circumferential edge 28, which outer circumferential edge 28 is bonded in an gas tight relationship to the open end 22 of the outer can member 20, as is best seen in FIG. 3. The bonding together of these members may be effected by means of an electron beam welding operation.

In accordance with the teachings of a preferred embodiment of this invention, the outer metal can member 20 is formed of a material such as 430 stainless steel, which is a high chrome containing stainless steel. The interior surface of the outer can member 20 may also have a chrome coating thereover. In a like manner, in accordance with the preferred teachings of this invention, the ring-shaped flexible diaphragm seal 24 is also formed of 430 stainless steel and has a thickness of about 0.010 to 0.20 inch.

The ring-shaped flexible diaphragm seal 24 has a generally "U" shaped cross section between its circumferential edges 26 and 28. This shape is readily apparent by viewing FIG. 3. The purpose of this shape is to provide resiliency to the ring-shaped flexible diaphragm seal 24.

The inner circumferential edge 26 of the flexible diaphragm seal 24 is of a diameter slightly less than the diameter of the outer facing surface 16 of the ceramic ring 12. As previously mentioned, this outer facing surface 16 is smooth. In such a manner, the inner circumferential edge 26 of the flexible diaphragm 24 forms an interference fit with the smooth, outer facing surface 16 of the ring-shaped ceramic member 12 to provide a gas tight seal therebetween.

A disc-shaped inner flexible diaphragm seal 30, formed of 430 stainless steel, has a curved cross section. This inner flexible seal has an outer circumferential edge 32 which has a diameter slightly greater in diameter than the diameter of the smooth, inner facing surface 14 of the ring-shaped ceramic member 12. In this manner, the outer circumferential edge 32 of the inner flexible diaphragm seal 30 forms an interference fit with the smooth, inner facing surface 14 of the ceramic ring 12 to provide a gas tight seal therebetween. A filler tube 34, associated with seal 30, is shown in its open condition providing a passageway to fill the electrode compartment defined in the interior of the inner casing 18.

As above described, the seals between two compartments of a sodium sulfur battery are formed in a relatively easy and simple manner, and in a manner in which the seals are formed within the diameter of an outer metal can 20. As discussed in this preferred embodiment, the seals are made across an alpha alumina ceramic ring. They may as well be made directly to the inner casing 18 which serves as the electrolyte of the battery.

In order to reduce the cost of the battery structure, it is preferable to use the ceramic ring in an as fired condition. By this, I mean that the ceramic ring is used as it is manufactured after the sintering thereof. In such a case, the inner surface 14 and outer surface 16 thereof are rough in nature. As was noted above, in order to make the inner surface 14 and outer surface 16 smooth, it is necessary to grind the same with a device such as a diamond grinding wheel. Such an operation is, of course, expensive.

The ceramic ring 12 may be used in an "as sintered" condition if the inner surface 14 and outer surface 16 are coated with a thin coating of a soft metalal, not shown. Such a metal coating may be, for example, an aluminum metal coating applied by a plasma spray operation. A preferred aluminum for such a spray operation is one having a high purity, such as an 1100 aluminum. In general, a metal coating of about 0.015 inches is sufficient to provide a smooth surface against which an interference fit may be made by the ring-shaped flexible diaphragm seal 24 and the disc-shaped inner flexible diaphragm seal 30 at their respective inner circumferential edge 26 and outer circumferential edge 32.

In general, I may say the savings resulting in not grinding the ceramic ring 12 and using it in its as sintered condition more than covers the cost of applying the smooth coating to the inner surface 14 and outer surface 16 of the ceramic ring 12 in such a plasma spray operation.

Once again, if one desires, they may use the seal directly to the ceramic material which forms the electrolyte of the battery, and may apply the coating thereto if the electrolyte is in an as sintered condition.

While particular embodiments of the invention have been illustrated and described, it will be obvious to those skilled in the art, that various changes and modifications may be made without departing from the invention, and it is intended to cover in the appended claims, all such modifications and equivalents as fall within the true spirit and scope of this invention.

What is claimed is:

1. In a sodium sulfur battery an improved seal for sealing against a ceramic member which acts as a separator between an anode compartment and a cathode compartment, which improved seal includes the following structure:

an outer metal can member of circular cross section having an open end;

a ring-shaped flexible diaphragm seal having an inner circumferential edge and an outer circumferential edge, said flexible diaphragm seal having a generally "U" shaped cross section between its circumferential edges to provide resiliency thereto, said outer circumferential edge of said flexible diaphragm being bonded in a gas tight relationship to said open end of said outer can member;

a ring-shaped ceramic member having a smooth, inner facing surface and a smooth, outer facing surface, said inner circumferential edge of said flexible diaphragm seal being slightly less in diameter than the diameter of said outer facing surface of said ring-shaped ceramic member whereby said inner circumferential edge of said flexible diaphragm forms an interference fit with said smooth, outer facing surface of said ring-shaped ceramic member to provide a gas tight seal therebetween; and a disc-shaped inner flexible diaphragm seal having a curved cross section and an outer diameter slightly greater in diameter than the diameter of said smooth, inner facing surface of said ring-shaped ceramic member whereby said outer circumferential edge of said inner flexible diaphragm forms an interference fit with said smooth, inner facing surface of said ring-shaped ceramic member to provide a gas tight seal therebetween.

2. The seal of claim 1, wherein said ring-shaped ceramic member is the electrolyte of the battery.

3. In a sodium sulfur battery an improved seal for sealing against a ceramic member which acts as a separator between an anode compartment and a cathode compartment, which improved seal includes the following structure:

an outer metal can member of circular cross section having an open end;

a ring-shaped flexible diaphragm seal having an inner circumferential edge and an outer circumferential edge, said flexible diaphragm seal having a generally "U" shaped cross section between its circumferential edges to provide resiliency thereto, said outer circumferential edge of said flexible diaphragm seal being bonded in a gas tight relationship to said open end of said outer can member;

an as sintered ring-shaped ceramic member having an inner facing surface and an outer facing surface;

a thin coating of a soft metal formed on both said inner facing surface and said outer facing surface of said ring-shaped ceramic member to define a smooth surface on both said inner facing surface and said outer facing surface of said ring-shaped ceramic member, said inner circumferential edge of said flexible diaphragm seal being slightly less in diameter than the diameter of said coated, facing surface of said ring-shaped ceramic member whereby said inner circumferential edge of said flexible diaphragm forms an interference fit with said coated, outer facing surface of said ring-shaped ceramic member to provide a gas tight seal therebetween; and a disc-shaped inner flexible diaphragm seal having a curved cross section and an outer diameter slightly greater in diameter than the diameter of said coated, inner facing surface of said ring-shaped ceramic member whereby said outer circumferential edge of said inner flexible diaphragm seal forms an interference fit with said coated, inner facing surface of said ring-shaped ceramic member to provide a gas tight seal therebetween.

4. The seal of claim 3, wherein said ceramic member is the electrolyte of the battery.

* * * * *